(12) United States Patent
Hafenrichter et al.

(10) Patent No.: US 9,302,787 B2
(45) Date of Patent: Apr. 5, 2016

(54) VACUUM ADHERING APPARATUS FOR AUTOMATED MAINTENANCE OF AIRFOIL-SHAPED BODIES

(71) Applicant: The Boeing Company, Chicago, IL (US)

(72) Inventors: Joseph L. Hafenrichter, Seattle, WA (US); Karl Edward Nelson, Shoreline, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 134 days.

(21) Appl. No.: 14/197,306

(22) Filed: Mar. 5, 2014

(65) Prior Publication Data
US 2014/0182479 A1   Jul. 3, 2014

Related U.S. Application Data

(63) Continuation-in-part of application No. 14/036,464, filed on Sep. 25, 2013, and a continuation-in-part of application No. 13/615,862, filed on Sep. 14, 2012, now Pat. No. 8,807,257.

(51) Int. Cl.
*G01D 21/00* (2006.01)
*B64F 5/00* (2006.01)

(52) U.S. Cl.
CPC .............. *B64F 5/0018* (2013.01); *B64F 5/0045* (2013.01)

(58) Field of Classification Search
None
See application file for complete search history.

(56) References Cited

U.S. PATENT DOCUMENTS

| | | | |
|---|---|---|---|
| 4,146,967 A | 4/1979 | Rohner et al. | |
| 5,031,458 A | 7/1991 | Young et al. | |
| 5,592,998 A * | 1/1997 | Urakami | B62D 57/00 180/164 |
| 5,698,787 A | 12/1997 | Parzuchowski et al. | |
| 6,220,099 B1 | 4/2001 | Marti et al. | |
| 6,796,014 B2 * | 9/2004 | Sarh | B21J 15/10 269/21 |
| 6,829,959 B2 | 12/2004 | Gifford et al. | |
| 7,134,649 B2 * | 11/2006 | Boyl-Davis | B25B 11/007 269/20 |
| 7,231,826 B2 | 6/2007 | Bossi et al. | |
| 7,240,556 B2 | 7/2007 | Georgeson et al. | |
| 7,315,609 B2 | 1/2008 | Safai et al. | |
| 7,337,673 B2 | 3/2008 | Kennedy et al. | |
| 7,380,776 B2 * | 6/2008 | Boyl-Davis | B25B 11/007 269/20 |
| 7,526,851 B1 * | 5/2009 | Boyl-Davis | B25B 11/007 29/559 |
| 7,562,593 B2 | 7/2009 | Engelbart et al. | |
| 7,640,811 B2 | 1/2010 | Kennedy et al. | |
| 2006/0043303 A1 | 3/2006 | Safai et al. | |
| 2009/0038398 A1 | 2/2009 | Lavoie et al. | |

OTHER PUBLICATIONS

MAUS Overview; http://www.boeing.com/defense-space/support/maintenance/commercial/maus.html; 4 pages.

* cited by examiner

*Primary Examiner* — Peter Macchiarolo
*Assistant Examiner* — Jermaine Jenkins
(74) *Attorney, Agent, or Firm* — Ostrager Chong Flaherty & Broitman P.C.

(57) ABSTRACT

Devices for enabling navigation of a crawler vehicle along an airfoil-shaped body, such as a helicopter blade, in a low-cost fashion with high reliability, especially for swept configuration blades. Using the natural tendency of vacuum adherence devices to adhere to changing surface contours, the crawler vehicle can adhere itself to airfoil-shaped structures in a way that allows the crawler vehicle to easily translate along an airfoil-shaped body while accommodating extreme variations along the surface of the airfoil-shaped body. The crawler vehicle can be designed to eliminate any trailing edge follower wheel, which simplifies the crawler's ability to accommodate trailing edge protrusions, such as trim tabs.

23 Claims, 9 Drawing Sheets

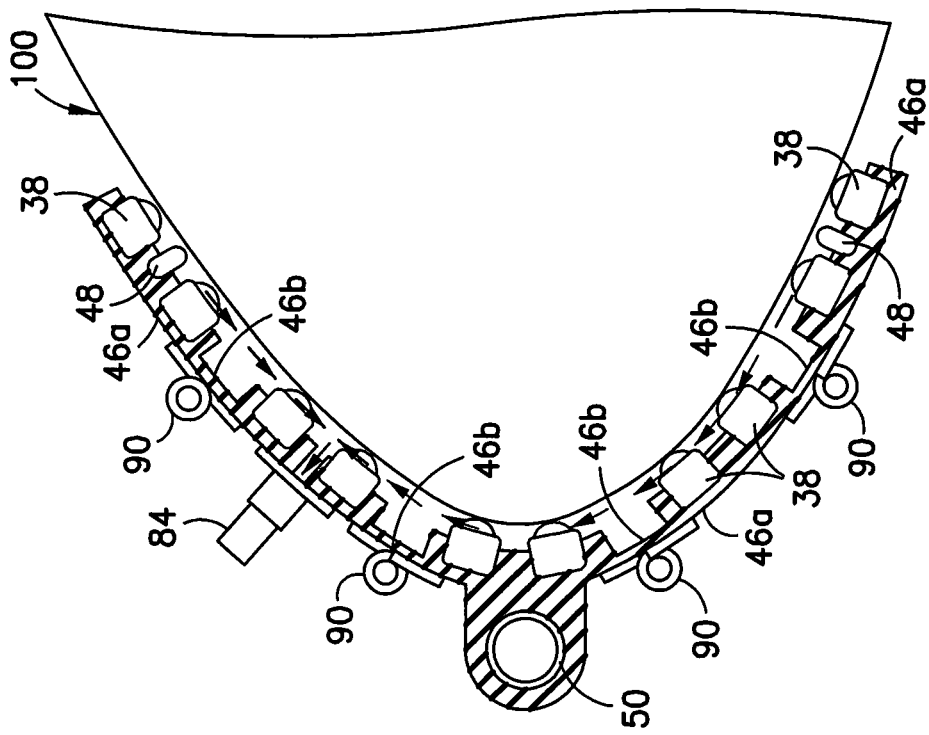
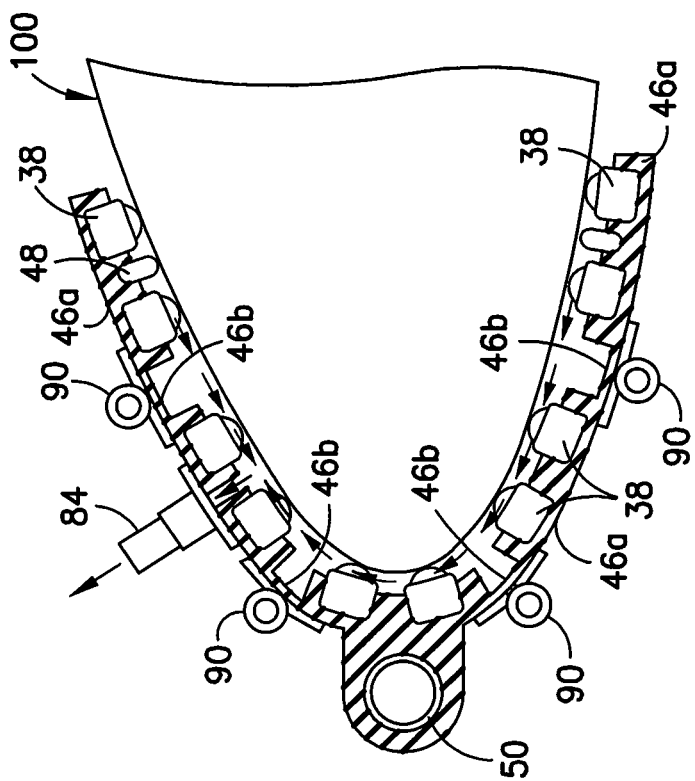

VACUUM ADHERING APPARATUS FOR AUTOMATED MAINTENANCE OF AIRFOIL-SHAPED BODIES

RELATED PATENT APPLICATIONS

This application is a continuation-in-part of and claims priority from U.S. patent application Ser. No. 14/036,464 filed on Sep. 25, 2013, which application is a continuation-in-part of and claims priority from U.S. patent application Ser. No. 13/663,709 filed on Oct. 30, 2012, which application is a continuation-in-part of and claims priority from U.S. patent application Ser. No. 12/657,424 filed on Jan. 19, 2010 and issued as U.S. Pat. No. 8,347,746 on Jan. 8, 2013. This application is also a continuation-in-part of and claims priority from U.S. patent application Ser. No. 13/615,862 filed on Sep. 14, 2012.

BACKGROUND

The present disclosure relates generally to the field of automated maintenance (including nondestructive inspection) of aircraft structural elements such as airfoil-shaped bodies, and more particularly to an automated end effector-carrying apparatus that is coupled to and travels along an airfoil-shaped body having a relatively short chord length while performing a maintenance function.

U.S. patent application Ser. No. 13/663,709 discloses automated apparatus for performing maintenance functions on airfoil-shaped bodies having short chord lengths, without the necessity of removing the airfoil-shaped body from the aircraft. One such apparatus comprises a platform, an end effector carried by the platform, the end effector being selected from a group of interchangeable end effectors, means for mounting the end effector-carrying platform on an airfoil-shaped body, means for moving the end effector-carrying platform in a spanwise direction along the airfoil-shaped body, and means for moving the end effector in a chordwise direction relative to the airfoil-shaped body when the platform is stationary. In one implementation, the automated apparatus comprises a blade crawler which is movable in a spanwise direction and comprises a traveling element (e.g., a slider) that is linearly translatable in a chordwise direction when the spanwise-movable blade crawler is stationary. The selected end effector (mounted to the aforementioned slider) can be moved in a chordwise direction when the blade crawler is stationary. The foregoing blade crawler was designed to use the leading and trailing edge features of the blade to maintain its alignment with the blade. In practice, however, it can be difficult to maintain crawler alignment on complexly curved blades with twist, camber and sweep. In addition, a blade crawler should be able to traverse over trailing edge protrusions such as trim tabs, trim tab covers, and other irregularities.

Some proposed solutions are too complex, having too many components. For example, one proposed solution employed a multiplicity of alignment/follower wheels and a compression spring to induce crawler alignment using compression mechanisms. Further, an aft follower wheel was employed provide compression against the trailing edge. This creates a difficulty when the crawler encounters trailing edge protrusions (e.g. trim tabs) necessitating a host of complex mechanisms in order to accommodate these anomalies. Complex alignment systems of the foregoing type can be expensive to develop, manufacture and maintain. For example, the opposing compression mechanisms of the rollers and alignment wheels may require continuous fine tuning and adjusting. Unless the compressing forces are adjusted properly, the crawler may encounter misalignment, thus lowering the usage value of the apparatus.

Some current solutions are limited in their effectiveness in that they do not accommodate swept blade configurations well. A crawler that can accommodate only moderate contour complexities may require either significant kinematics re-programming or manual operator intervention. Next generation helicopter blades and emerging blade designs will have significant swept tip designs. This will be a significant difficulty that may need to be overcome for maintenance blade crawlers to be successfully deployed to factories, depots and forward bases.

A blade crawler design that improves the crawler's ability to navigate over swept helicopter blade configurations and simplifies the componentry that couples the crawler to the helicopter blade would be a technological advance.

SUMMARY

The subject matter disclosed in detail below is directed to an automated end effector-carrying apparatus that is capable of being coupled to and then traveling along an airfoil-shaped body having a relatively short chord length while performing a maintenance function. As used herein, the term "maintenance" includes, but is not limited to, operations such as nondestructive inspection (NDI), drilling, scarfing, grinding (e.g., to remove bonded or bolted components), fastening, appliqué application, ply mapping, depainting, cleaning, and painting. Any one of a multiplicity of end effectors for performing a respective one of the foregoing maintenance functions can be attached to the apparatus disclosed herein. There are a number of types of blade components on aircraft that will benefit from maintenance automation, including rotorcraft blades, propeller blades, flaps, ailerons, trim tabs, slats, stabilators and stabilizers. As a whole, the automated apparatus disclosed herein reduces maintenance time, labor hours and human errors when robotic maintenance functions are performed on blade components.

The apparatuses disclosed herein comprise devices for maintaining crawler alignment on complex-shaped blades while at the same time enabling the blade crawler to traverse over trailing edge protrusions. The disclosed devices enable robust and automatic motion where the crawler can track along complex curvature blades with twist, camber and sweep, and can also traverse over trailing edge protrusions. With the ability to track along complex-geometry rotor blades, propellers and other airfoils, and the ability to autonomously traverse over trailing edge protrusions without loss of functionality, a crawler equipped with the devices disclosed hereinafter can provide manufacturing and in-service automated NDI and repair functionality.

The devices disclosed in detail below enable navigation of a crawler vehicle along an airfoil-shaped body, such as a helicopter blade, in a low-cost fashion with high reliability, especially for swept configuration blades. Using the natural tendency of vacuum manifolds to adhere to changing surface contours, the crawler vehicle can adhere itself to airfoil-shaped structures in a way that allows it to easily translate along the blade while accommodating extreme variations along the surface of the blade. The crawler vehicle can be designed to eliminate any trailing edge follower wheel, which simplifies the crawler's ability to accommodate trailing edge protrusions, such as trim tabs.

One aspect of the subject matter disclosed in detail below is an apparatus comprising: a frame; and a vacuum adherence device coupled to the frame, the vacuum adherence device comprising a seal, the orientation of the seal relative to the frame being adaptable. The apparatus may further comprise: a carriage linearly displaceably coupled to the frame; a first motor for driving linear displacement of the carriage along the frame; an end effector coupled to the carriage, the end effector being configured to perform a maintenance function; a drive wheel rotatably coupled to the frame; and a second motor for driving rotation of the drive wheel. Also, the foregoing apparatus may further comprise a ball-and-socket bearing coupled to the frame or to the vacuum adherence device, wherein a ball of the ball-and-socket bearing is disposed within or in proximity to an area bounded by the seal and protrudes beyond the seal.

In accordance with some embodiments of the apparatus described in the preceding paragraph, the vacuum adherence device comprises a vacuum plate having a channel, the seal is attached to and projects from a side of the vacuum plate, and the ball-and-socket bearing is coupled to the vacuum plate in an area bounded by the seal, the apparatus further comprising a vacuum port in flow communication with a space adjacent the area bounded by the seal via the channel. In one embodiment, the vacuum plate comprises flexible material capable of conforming to a shape of a confronting surface of an airfoil-shaped body. In another embodiment, the vacuum plate comprises a plurality of rigid segments, a plurality of continuous membranes connecting the plurality of rigid elements in series, and a plurality of hinges which pivotably couple adjacent rigid elements of the plurality of rigid elements.

In accordance with other embodiments of the apparatus described above, the apparatus further comprises an attachment plate having a first channel, wherein the vacuum adherence device comprises a suction cup having a second channel in flow communication with the first channel, the suction cup and the ball-and-socket bearing being attached to the attachment plate, and the second channel having an opening surrounded by the seal. In one such embodiment, the suction cup comprises: a sleeve housing attached to the attachment plate; a sleeve comprising a first portion displaceably coupled to the sleeve housing and a second portion comprising a bearing surface; and a socket ring pivotably coupled to the second portion of the sleeve and comprising a bearing surface in contact with the bearing surface of the second portion of the sleeve, the seal being attached to the socket ring.

Another aspect of the subject matter disclosed herein is an apparatus comprising: a frame; an attachment plate coupled to the frame; and a plurality of suction cups, each of the suction cups comprising a sleeve housing attached to the attachment plate, a sleeve comprising a first portion displaceably coupled to the sleeve housing and a second portion comprising a bearing surface, a socket ring pivotably coupled to the second portion of the sleeve and comprising a bearing surface in contact with the bearing surface of the second portion of the sleeve, and a seal attached to the socket ring. This apparatus may further comprise: a carriage linearly displaceably coupled to the frame; a first motor for driving linear displacement of the carriage along the frame; an end effector coupled to the carriage, the end effector being configured to perform a maintenance function; a drive wheel rotatably coupled to the frame; and a second motor for driving rotation of the drive wheel. In addition, the foregoing apparatus may further comprise first and second ball-and-socket bearings, each of the first and second ball-and-socket bearings comprising a socket attached to the attachment plate and a ball rotatably coupled to the socket.

A further aspect is an apparatus comprising: a frame; a vacuum plate coupled to the frame, the vacuum plate comprising a channel; a seal attached to and projecting from a side of the vacuum plate; a vacuum port in flow communication with a space adjacent the area bounded by the seal via the channel of the vacuum plate; a carriage linearly displaceably coupled to the frame; a first motor for driving linear displacement of the carriage along the frame; an end effector coupled to the carriage, the end effector being configured to perform a maintenance function; a drive wheel rotatably coupled to the frame; and a second motor for driving rotation of the drive wheel. In accordance with some embodiments, the vacuum plate comprises flexible material capable of conforming to a shape of a confronting surface of an airfoil-shaped body. In accordance with other embodiments, the vacuum plate comprises a plurality of rigid segments, a plurality of continuous membranes connecting the plurality of rigid elements in series, and a plurality of hinges which pivotably couple adjacent rigid elements of the plurality of rigid elements. The apparatus may further comprise a plurality of ball-and-socket bearings coupled to the vacuum plate, wherein the vacuum plate can be positioned adjacent a portion of an airfoil-shaped body in a manner such that the seal is adjacent to and balls of the plurality of ball-and-socket bearings are in contact with that portion of the airfoil-shaped body.

Yet another aspect of the subject matter disclosed in detail below is a method for coupling a crawler vehicle to an airfoil-shaped body, comprising: (a) equipping the crawler vehicle with vacuum adherence devices; (b) placing the vacuum adherence devices in positions such that respective seals of those vacuum adherence devices are adjacent to respective other portions of the surface of the airfoil-shaped body; and (c) partially evacuating respective channels of the vacuum adherence devices to produce floating adherence of the crawler vehicle to the surface of the airfoil-shaped body. This method may further comprise: equipping the crawler vehicle with ball-and-socket bearings, a drive wheel and a motor for driving rotation of the drive wheel; placing the ball-and-socket bearings and the drive wheel in contact with respective portions of the surface of the airfoil-shaped body, the driver roller being oriented to roll in a spanwise direction along the surface of the airfoil-shaped body; and driving the drive wheel to rotate.

A further aspect is a system comprising: an airfoil-shaped body having a surface; a frame; a first vacuum adherence device comprising a channel and a seal capable of adapting to a contour of the surface; a vacuum system coupled to enable partial evacuation of the channel of the first vacuum adherence device; and a drive wheel in contact with the airfoil-shaped body, wherein the first vacuum adherence device, the first ball-and-socket bearing, and the drive wheel are coupled for concurrent movement with the frame. The vacuum system may comprise an electrically controllable valve. The system may further comprise: a carriage linearly displaceably coupled to the frame; an end effector carried by the carriage, the end effector being configured to perform a maintenance function; a first motor for driving linear displacement of the carriage; a second motor for driving rotation of the drive wheel; and a computer system programmed to control the electrically controllable valve and the first and second motors during a maintenance operation in which the end effector travels over the surface of the airfoil-shaped body. In addition, the foregoing system may further comprise a ball-and-socket bearing comprising a ball in contact with the surface of the airfoil-shaped body.

In accordance with some embodiments of the system described in the preceding paragraph, the first vacuum adherence device comprises a flexible vacuum plate having the channel formed therein and the seal attached thereto, the flexible vacuum plate being capable of conforming to a contour of the surface of the airfoil-shaped body. In accordance with other embodiments, the first vacuum adherence device comprises a plurality of rigid segments, a plurality of continuous membranes connecting the plurality of rigid elements in series, and a plurality of hinges which pivotably couple adjacent rigid elements of the plurality of rigid elements. Optionally, a plurality of ball-and-socket bearings are coupled to the vacuum plate, the plurality of ball-and-socket bearings projecting from the vacuum plate and being in contact with the surface of the airfoil-shaped body, the seal and surfaces of the vacuum plate and the airfoil-shaped body forming a chamber in flow communication with the channel.

In accordance with alternative embodiments, the first vacuum adherence device comprises a sleeve housing, a sleeve comprising a first portion displaceably coupled to the sleeve housing and a second portion comprising a bearing surface, and a socket ring pivotably coupled to the second portion of the sleeve and comprising a bearing surface in contact with the bearing surface of the second portion of the sleeve, the seal being attached to the socket ring.

The system may further comprise a second vacuum adherence device comprising a channel and a seal capable of adapting to a contour of the surface, the second vacuum adherence device being carried by the frame, and the vacuum system comprising a manifold in flow communication with the channels of the first and second vacuum adherence devices. The system may further comprises first and second vacuum generators in fluid communication with the channels of the first and second vacuum adherence devices respectively.

The floating suction cups described above provide adherence. The ball-and-socket bearings provide alignment that works in conjunction with vacuum adherence devices to keep the crawler attached to the blade at precise standoff distances. The floating vacuum plate (flexible or hinged) provides both adherence and alignment.

Other aspects of blade crawlers capable of performing maintenance functions while traveling along an airfoil-shaped body having a relatively short chord length are disclosed and claimed below.

BRIEF DESCRIPTION OF THE DRAWINGS

FIGS. 10A and 10B are diagrams showing sectional views of a hinged vacuum plate designed to conform to the leading edge of a blade component in accordance with an alternative embodiment. In FIG. 10A, the hinged vacuum plate is shown adhered to a small-radius leading edge; in FIG. 10B, the hinged vacuum plate is shown adhered to a large-radius leading edge.

Reference will hereinafter be made to the drawings in which similar elements in different drawings bear the same reference numerals.

DETAILED DESCRIPTION

Embodiments of vacuum-adhering blade crawlers capable of performing maintenance functions while traveling along an airfoil-shaped body will now be described for the purpose of illustration. The vacuum adherence functionality is provided by one or more vacuum adherence devices. Rolling elements are provided to assist in aligning the blade crawler with the airfoil-shaped body, which rolling elements are preferably capable of omnidirectional movement. The omnidirectional rolling elements (e.g., ball-and-socket bearings) work in conjunction with the vacuum adherence devices (e.g., one or more floating flexible vacuum plates and/or one or more floating suction cups) to enable the blade crawler to adhere to but still move freely over the surface of the airfoil-shaped body. Chassis position and angularity are maintained by vacuum adherence devices which float on the surfaces of the airfoil-shaped body during a maintenance operation. Each vacuum adherence device is designed to float due to the presence of an air cushion between a seal and the blade surface when the vacuum adherence device is partially evacuated. This air cushion enables lateral displacement of the crawler relative to the airfoil-shaped body because contact friction between the seal and body surface is avoided. The resulting total suction force is strong enough to adhere the crawler to the airfoil-shaped body, but not so strong as to inhibit lateral displacement.

In the following disclosure, certain vacuum-adhering means will be referred to herein as vacuum plates and suction cups. In these contexts, the modifiers "vacuum" and "suction" should be treated as synonymous. The vacuum plates and suction cups disclosed herein each comprise a channel and a seal. When the channels are partially evacuated, the resulting partial vacuums produce adherence forces sufficient to adhere the blade crawler to a blade component. The seals are configured to adapt to the contour of the surface of the blade component.

Figure 1:
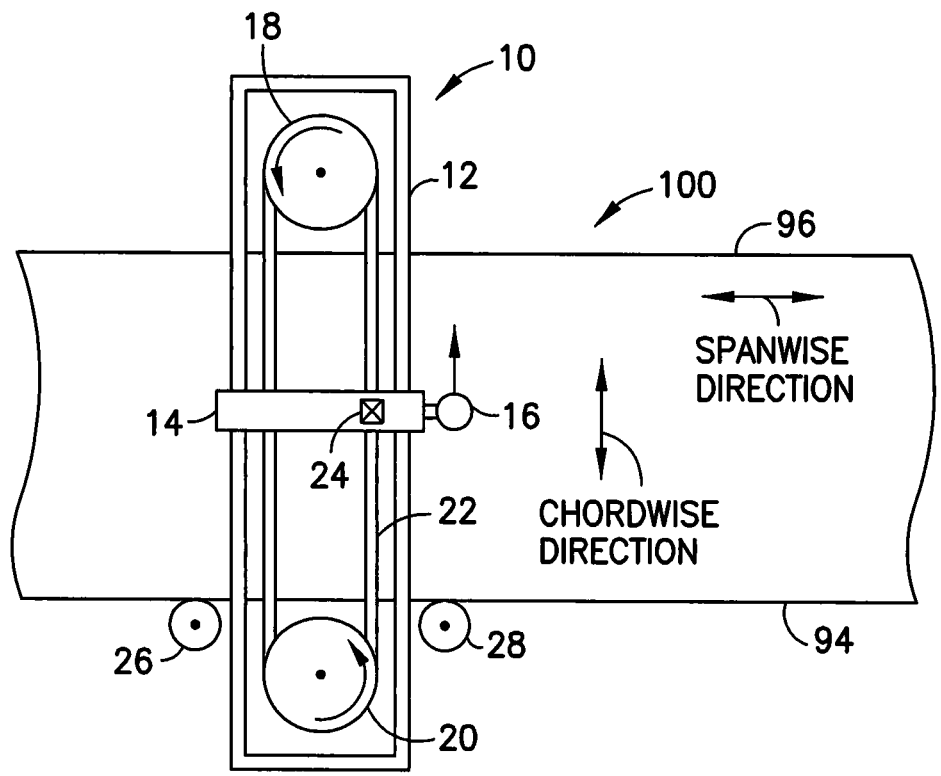
FIG. 1 is a diagram showing a top plan view of a blade crawler comprising an end effector for performing a maintenance function on an airfoil-shaped body (e.g., a blade component) having a short chord length and means for scanning that end effector in a chordwise direction.

FIG. 1 is a top view showing aspects of one design for an autonomous, self-propelled blade crawler 10 for performing a maintenance function on an airfoil-shaped body 100 (such as a rotorcraft blade, an aircraft propeller, a small winglet, or a narrow tail section) by crawling along the length of the airfoil-shaped body (i.e., in a spanwise direction) using the airfoil-shaped body 100 as a track and scanning an end effector 16 (e.g., a non-destructive inspection sensor or sensor array or some other maintenance tool) in a chordwise direction. The airfoil-shaped body 100 has a leading edge 94 and a trailing edge 96. Although not shown in FIG. 1, the airfoil-shaped body 100 may have trailing edge protrusions (such as trim tab 98 seen in FIG. 2). The blade crawlers disclosed are designed such that trailing edge protrusions are not an impediment to spanwise scanning of the airfoil-shaped body.

As seen in FIG. 1, the blade crawler 10 comprises a frame 12 having a length greater than a chordwise dimension of the airfoil-shaped body 100. The end effector 16 is carried by a carriage 14 which is displaceably coupled to frame 12 in a manner that allows the carriage 14 to travel back and forth along the frame 12 in the chordwise direction. For example, the carriage 14 may be displaceably coupled to frame 12 by means of a pair of linear guide units (not shown), each linear guide unit comprising a respective linear guide track attached to a respective side of frame 12 and a respective slider attached to the carriage 14. Each slider may comprise a pair of recirculating ball bearings, the balls of which roll along the corresponding linear guide track. Optionally, the position of the carriage 14 can be encoded to provide feedback to a motion control subsystem (not shown). In accordance with one embodiment, the end effector 16 may be pivotably coupled to the carriage 14 to enable the end effector 16 to follow the curved surface of the airfoil-shaped body 100 during chordwise displacement of the carriage 14. A tool chordwise position encoder may be provided which works by encoding the position of the carriage 14 relative to the frame 12, e.g., by outputting pulses representing incremental movements of carriage 14 along frame 12.

To translate the end effector 16 chordwise across the airfoil-shaped body 100, the carriage 14 is attached to a belt 22 by a clamp or fastener 24. The belt 22 circulates (in part) around a drive pulley 18 and a passive pulley 20, these pulleys being rotatably coupled to and carried by the frame 12. Preferably the drive pulley 18 and passive pulley 20 are sufficiently far apart from each other that the range of motion of carriage 14 includes the entire chordwise dimension of the airfoil-shaped body 100. The drive pulley 18 is operatively coupled to a motor (not shown in FIG. 1, but see stepper motor 78 in FIG. 11), which motor is also mounted to frame 12 and operates under the control of the motion control system. Alternatively, the carriage 14 may be driven to displace along the frame 12 by other well-known means, such as a frame-mounted lead screw coupled to a nut attached to the carriage 14.

To move the blade crawler 10 in a spanwise direction along the airfoil-shaped body 100, a drive wheel 26 is mounted to an output shaft of another motor (not shown in FIG. 1, but see stepper motor 76 in FIG. 11) which is mounted to frame 12. The drive wheel 26 is positioned and oriented to engage a leading edge 94 of the airfoil-shaped body 100. The drive wheel can be placed in other locations such as on the top, underside or trailing edge of the blade of the airfoil-shaped body. Rotation of drive wheel 26 while in frictional contact with the leading edge 94 can produce a tractive force sufficient to cause the blade crawler 10 to travel in a spanwise direction along the airfoil-shaped body 100. In addition, a follower wheel 28 is rotatably mounted to frame 12 by means not shown in FIG. 1. The follower wheel 28 is displaced spanwise from the drive wheel 26 as shown. Additional means for maintaining crawler alignment with the airfoil-shaped body 100, such as ball-and-socket bearings and vacuum adherence devices, are not shown in FIG. 1.

Although not shown in FIG. 1, the blade crawler 10 may further comprise a crawler spanwise position encoder in the form of a rotary encoder mounted to frame 12 that carries an encoder wheel on a free end of a shaft. The spanwise position of the blade crawler 10 can be measured by the rotary encoder, which encodes rotation of the encoder wheel. The encoder wheel rides on the surface of the airfoil-shaped body 100 as the blade crawler 10 travels in the spanwise direction. The rotary encoder sends respective encoder pulses to an operations control center (e.g., via an encoder cable or a wireless connection) after each incremental movement of the blade crawler 10 in the spanwise direction. When the end effector 16 is an NDI scanner, these encoder pulses are used by a control computer (not shown) and by ultrasonic pulser/receiver devices (not shown) to determine the spanwise coordinate of each scan plane in a well-known manner.

The alignment and movement of automated blade crawlers of the type shown in FIG. 1 can be enhanced by the addition of vacuum adherence devices that assist in maintaining crawler alignment during spanwise motion. Various embodiments which employ a plurality of floating suction cups to produce adherence forces will now be described with reference to FIGS. 2-4.

Figure 2:
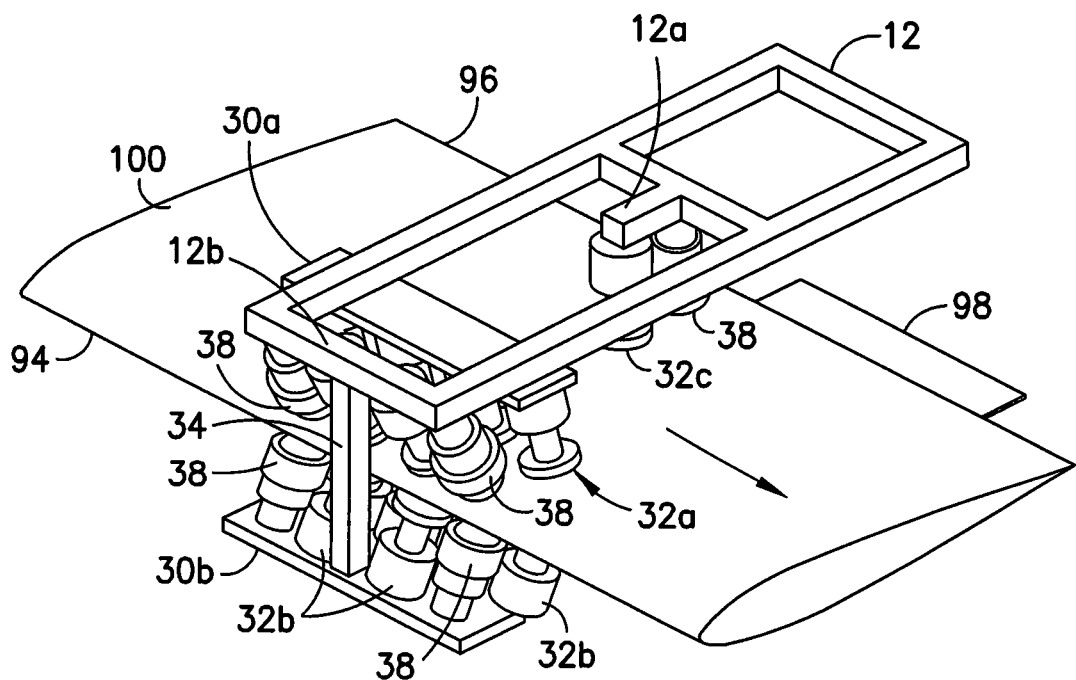
FIG. 2 is a diagram showing an isometric view of some components of a blade crawler having a plurality of suction cups for maintaining adherence and a plurality of ball-and-socket bearings for maintaining alignment on a blade component in accordance with one embodiment. The end effector for performing a maintenance function and the means for scanning that end effector in a chordwise direction are not shown to avoid clutter in the drawing.

FIG. 2 shows an isometric view of some components of a blade crawler having a multiplicity of floating suction cups for maintaining alignment on a blade component in accordance with one embodiment. The end effector for performing a maintenance function and the means for scanning that end effector in a chordwise direction are not shown to avoid clutter in the drawing. The use of vacuum adherence devices eliminates the needs for an aft lower contact wheel and an aft follower wheel disposed at the trailing edge 96, and also enables alternative placement of drive wheel (not shown). In addition, it should be understood that, although not shown in FIG. 2, the blade crawler comprises at least one drive motor/drive wheel for self-propulsion and means for scanning an end effector in a chordwise direction even though such components are not shown. This convention will also be adopted in FIGS. 3, 4, 9A and 9B.

The arrow in FIG. 2 represents spanwise motion in a direction such that the blade crawler will need to pass a trim tab 98 coupled to a rear edge 96 of the airfoil-shaped body 100. None of the blade crawler components depicted in FIG. 2 is in a position that would interfere with such spanwise movement past a trim tab. The blade crawler partly shown in FIG. 2 has a rigid support structure that comprises a frame 12 (which in turn comprises a cantilever beam 12a and a forward cross beam 12b), a vertical beam 34 having an upper end connected to forward cross beam 12b of frame 12, an upper adherence attachment plate 30a attached to the side beams of frame 12, and a lower adherence attachment plate 30b attached to a lower end of vertical beam 34. This rigid support structure supports multiple devices which enable the frame 12 to travel in a spanwise direction along the airfoil shaped body 100, including floating suction cups and ball-and-socket bearings.

Figure 3:
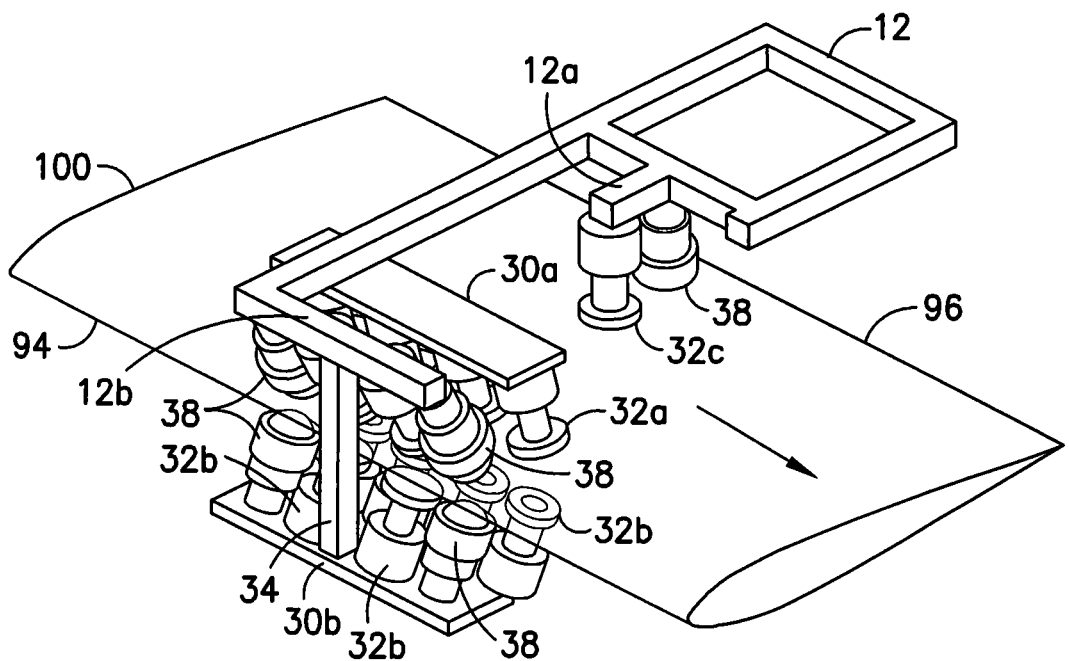
FIG. 3 is a diagram showing an isometric view of some components of the same blade crawler depicted in FIG. 2, except that a portion of the chassis has been omitted to reveal structure that would otherwise be blocked from view.

FIG. 3 is a partial cut-away view of the apparatus depicted in FIG. 2 in a stationary position on an airfoil-shaped body 100. A portion of one of the side beams of frame 12 has been removed to reveal the structure that would otherwise be hidden behind that removed portion. Referring to FIG. 3, the frame 12 supports a first plurality of floating suction cups 32a, including a row of four attached to the upper adherence attachment plate 30a and two attached to the forward cross beam 12b; a second plurality of suction cups 32b, in including four in a first row and two in a second row attached to the lower adherence attachment plate 30b; and a single suction cup 32c attached to the cantilever beam 12a. In an alternative embodiment (not shown), the upper adherence attachment plate 30a could be enlarged so that the two suction cups attached to cross beam 12b in FIG. 3 could instead be attached to the enlarged upper adherence attachment plate 30a. Each suction cup may comprise a channel in flow communication with a vacuum system (not shown in FIGS. 2 and 3) and a seal that contacts the surface of the airfoil-shaped body 100 when the vacuum system is not activated.

In addition, the rigid support structure depicted in FIG. 3 supports a multiplicity of ball-and-socket bearings 38. In the implementation depicted in FIGS. 2 and 3, one ball-and-socket bearing is attached to cantilever beam 12a, two ball-and-socket bearings are attached to forward cross beam 12b, and two ball-and-socket bearings are attached to lower adherence attachment plate 30b. Additional ball-and-socket bearings could be included. It should be noted that the ball-and-socket bearings are positioned in proximity to the floating suction cups to allow the former to work in conjunction with the latter to induce alignment of the blade crawler with the airfoil-shaped body 100.

Figure 4:
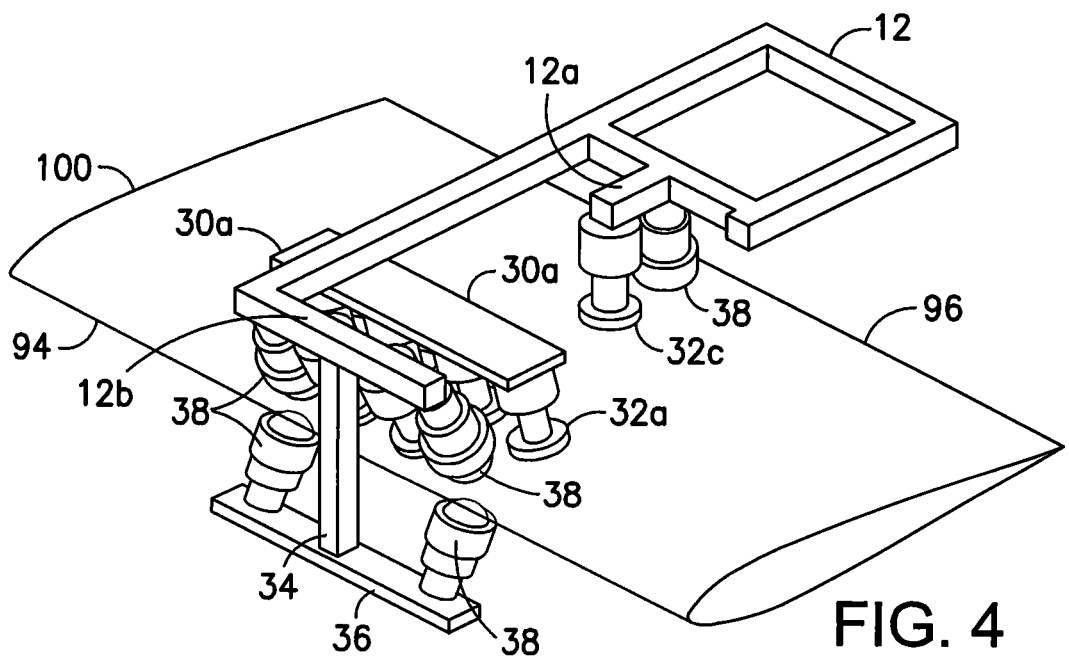
FIG. 4 is a diagram showing an isometric view of some components of a blade crawler having a plurality of floating suction cups for maintaining adherence and a plurality of ball rollers for maintaining alignment on a blade component in accordance with an alternative embodiment. The end effector for performing a maintenance function and the means for scanning that end effector in a chordwise direction are not shown to avoid clutter in the drawing. Also a portion of the chassis has been omitted to reveal structure that would otherwise be blocked from view.

FIG. 4 shows an isometric view of some components of a blade crawler having a plurality of floating suction cups for maintaining alignment on a blade component in accordance with an alternative embodiment. In this alternative embodiment, the lower adherence manifold assembly seen in FIG. 3 is replaced by a ball-and-socket bearing assembly without suction cups. In the implementation depicted, the ball-and-socket bearing assembly comprises a lower attachment plate 36 connected to and extending transversely from the lower end of the vertical beam 34 of the support structure and a pair of ball-and-socket bearings 38 attached to the opposing arms of the attachment plate 36. The ball-and-socket bearings 38 attached to attachment plate 36 contact a lower surface of the leading edge 94, while an opposing pair of ball-and-socket bearings 38 attached to the forward cross beam 12b contact an upper surface of the leading edge 94 of the airfoil-shaped body 100.

Figure 5:
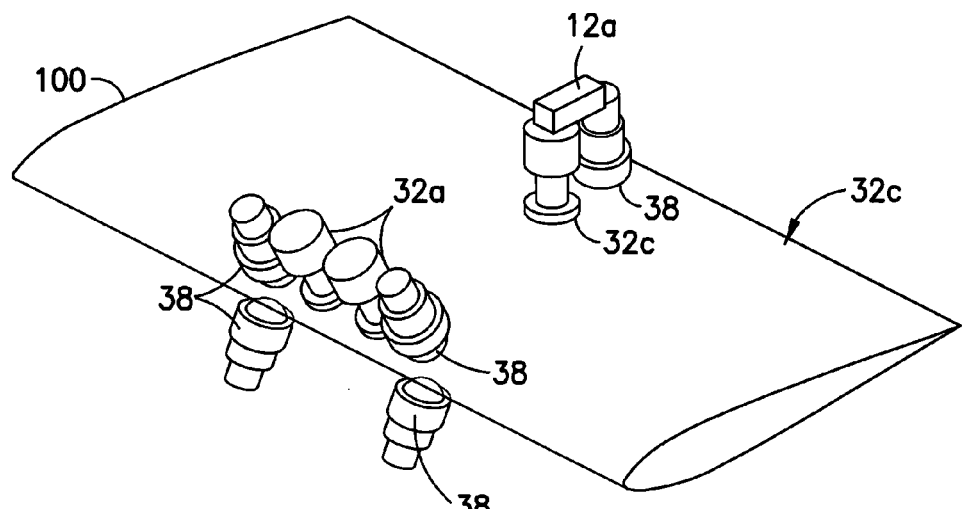
FIG. 5 is a diagram showing an isometric view of three suction cups and five ball-and-socket bearings of a blade crawler in relation to an airfoil-shaped body. In accordance with this embodiment, the blade crawler has five points of contact and, when the suction cups are evacuated, three zones of adherence.

FIG. 5 is an isometric view of three suction cups 32a, 32c and five ball-and-socket bearings 38 of a blade crawler in relation to an airfoil-shaped body 100. Other portions of the blade crawler are not shown. In accordance with this configuration, the blade crawler has five points of contact and, when the suction cups are evacuated, three zones of adherence. This configuration is sufficient to adhere and align a blade crawler on an airfoil-shaped body 100 without including any rolling elements that contact the trailing edge of the airfoil-shaped body 100, thereby enabling crawler scanning of airfoil-shaped bodies having trailing edge protrusions and/or swept blade designs.

Figure 6:
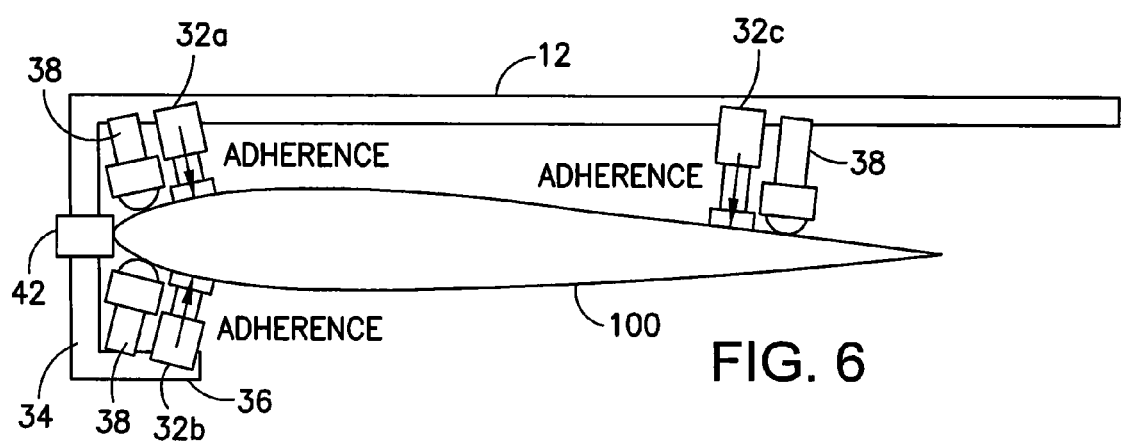
FIG. 6 is a diagram showing the location of three points of adherence of the blade crawler depicted in FIG. 5 in a plane generally perpendicular to a spanwise axis of the airfoil-shaped body.

In accordance with a variation of the configuration shown in FIG. 5, two additional floating suction cups can be placed in proximity to the lower surface of the airfoil-shaped body, providing five points of adherence. FIG. 6 is a side view of this configuration in which three suction cups 32a-32c and three ball-and-socket bearings 38 are visible. Fourth and fifth suction cups behind suction cups 32a and 32b respectively and fourth and fifth ball-and-socket bearings respectively behind the ball-and-socket bearings 38 in proximity to the upper and lower surfaces of the leasing edge of the airfoil-shaped body 100 are not visible in FIG. 6. This configuration is sufficient to induce alignment of the crawler with the airfoil-shaped body 100. As seen in FIG. 6, a drive roller 42 is provided to induce crawler motion in a spanwise direction as the drive roller 42 frictionally contacts the leading edge of the airfoil-shaped body 100. The suction cups 32a-32c will function when the airfoil-shaped body 100 has any one of a multiplicity of orientations that may be encountered at helicopter depots or aircraft maintenance facilities, including horizontal, vertical or at an acute angle. The blade crawler partly depicted in FIG. 6 can also be reversed 180 degrees and coupled to the airfoil-shaped body 100 in a manner such the suction cup 32b is above and suction cups 32a and 32c are below the airfoil-shaped body 100.

Still referring to FIG. 6, the vertical distance separating the balls of the upper and lower ball-and-socket bearings 38 near the leading edge of the airfoil-shaped body 100 will be selected so that the opposing balls respectively contact the upper and lower surfaces of the airfoil-shaped body 100. The length of the vertical beam 34 connecting an upper portion of frame 12 to a lower cantilever beam 36 (is this 12a?) may be adjustable. For example, the vertical beam 34 may comprise an upper and lower vertical beam sections arranged in a telescoping relationship such that the length of the vertical beam 34 is adjustable. A locking device (not shown) can be unlocked to allow length adjustment and then locked to set the length adjustment. For example, when the balls of the upper and lower ball-and-socket bearings 38 near the leading edge of the airfoil-shaped body 100 are separated by an optimum vertical distance, a set screw or other locking means can be used to prevent further relative movement of the vertical beam sections during crawler operation.

The ball-and-socket bearings 38 enable motion of the apparatus along complex-shaped blades (i.e., in a spanwise direction) without causing misdirection. The ball-and-socket bearings 38 can be similar to any one of a plurality of commercially available types of ball-and-socket bearings, such as those used in the design of office furniture. When ball-and-socket bearings are used in conjunction with vacuum adherence devices, a nearly frictionless omni-directional alignment device is provided. The ball-and-socket bearings 38 maintain positive alignment of the crawler with the blade features without causing misdirection, so that complex-curvature blades with twist, camber and sweep can be accommodated.

Returning to FIG. 3, each floating suction cup 32a-32c comprises a channel in flow communication with a vacuum system via a respective manifold. The upper and lower attachment plates 30a, 30b, cantilever beam 12a, and forward cross beam 12b each comprise a respective manifold (not shown) which is in fluid communication with channels of the suction cups attached to those support elements. The term "manifold" is used herein in the sense of a chamber or duct having several outlets through which a fluid can be distributed or gathered. These manifolds connect the channels in the suction cups to the vacuum system, which may comprise a vacuum pump and one or more electrically controllable valves between the vacuum pump and the manifolds. The vacuum system is connected to the crawler vehicle by way of an umbilical cable that may includes air lines, electrical lines, and even a water line (e.g., in cases where the end effector is an ultrasonic sensor or sensor array). In accordance with alternative embodiments, each individual floating suction cup has a respective vacuum motor (not shown).

Figure 7A:
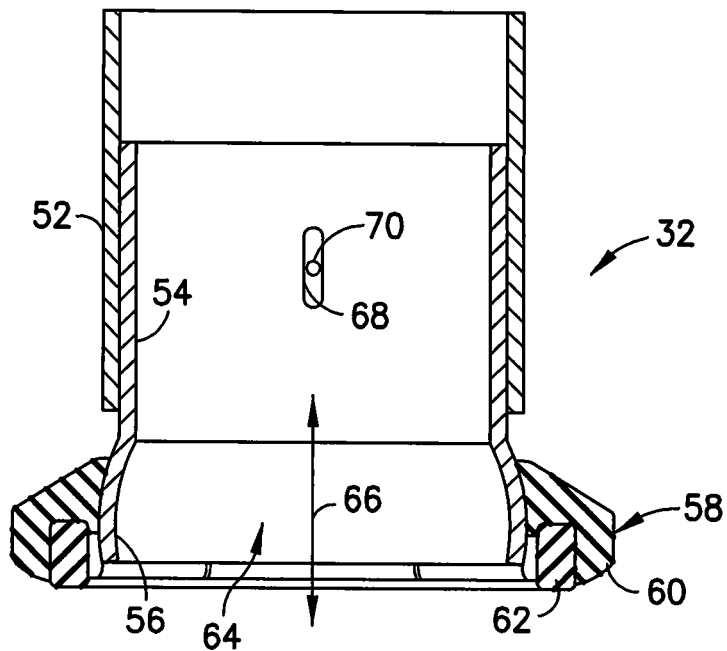
FIG. 7A is a diagram showing a cross-sectional view of a vacuum adherence device in accordance with one implementation.

In accordance with one embodiment, all of the floating suction cups have a similar structure. FIG. 7A is a diagram showing a cross-sectional view of a suction cup 32 in accordance with one implementation. This suction cup 32 comprises a circular cylindrical sleeve housing 52 and a sleeve 54 having a circular cylindrical portion which is axially slidable along a center axis 66 inside the sleeve housing 52. The sleeve 54 further comprises bearing portion 56 having an outer spherical bearing surface having a center point located along the center axis 66. The bearing portion 56 may be integrally formed with the aforementioned circular cylindrical portion of sleeve 54. The suction cup 32 further comprises a pivotable seal assembly 58 comprising a socket ring 60 that holds a seal 62. The socket ring 60 also has an inner spherical bearing surface which is concentric with and pivotably coupled to the outer spherical bearing surface of bearing portion 56 of sleeve 54. The pivot point of the socket ring 60 is collocated with the center point of the outer spherical bearing surface of bearing portion 56 of sleeve 54.

The pivotable seal assembly 58 is configured to rotate relative to the sleeve 54 about the pivot point to at least partially conform to a shape of a confronting surface. The floating suction cup 32 can adhere to such a confronting surface when air is drawn into a channel 64 formed in part by the channel of sleeve housing 52, in part by the channel of sleeve 54, and in part by the opening in the seal 62. The pivotable seal assembly 58 is configured to rotate relative to the sleeve 54 independently of translational movement of the sleeve 54 in a direction parallel to the center axis 66 within the sleeve housing 52. The amount of rotation of pivotable seal assembly 58 may be limited by the size and/or shape of the outer spherical bearing surface of the bearing portion 56 of sleeve 54.

Although not shown in FIG. 7A, the floating suction cup preferably comprises a spring arranged to urge the sleeve 54 to extend out of the sleeve housing 52 by downward (as seen in the view of FIG. 7A) sliding along the center axis 66. This sliding movement may be restricted to within a selected range of movement. However, sleeve 54 may "float" freely relative to sleeve housing 52 within this selected range of movement. This restriction of the translational motion of sleeve 54 can be implemented by providing a slot 68 in the wall of the circular cylindrical portion of sleeve 54 and by providing a pin 70 which extends radially inward from the wall of sleeve housing 52 and into the slot 68. The pin 70 may also be used to hold sleeve 54 inside sleeve housing 52. The length of slot 68 restricts the sliding movement of sleeve 54 relative to sleeve housing 52.

To generate vacuum adherence forces, the channel 64 is in fluid communication with a control valve (not shown in FIG. 7A), which control valve is in turn in flow communication with a vacuum pump (also not shown in FIG. 7A). The vacuum pump, control valve, channel 64, and connecting conduits form a vacuum system which is configured to draw air into the channel 64 such that a vacuum adherence is formed between the pivotable seal assembly 58 and a confronting surface. The vacuum adherence is the result of a vacuum pressure generated inside the channel 64. As a result of this partial vacuum inside the suction cup, ambient air can be sucked into channel 64. The ambient air flows through any gap between the seal 62 and the confronting surface of the airfoil-shaped body. The flow of air radially inward through such gap has the effect of producing an air cushion. The height of the gap may vary along the periphery of the seal 62. This gap height depends on the shape of the confronting surface and the degree of rotation of the seal 62 to conform to that shape.

The seal 62 may be formed of any one of a number of different materials. For example, seal 62 may comprise silicone rubber or other elastomeric material, a viscoelastomeric material, or some other suitable flexible material.

It may be appreciated that different embodiments may be designed to take into account different considerations. For example, a vacuum adherence system for a blade crawler may comprise a multiplicity of floating suction cups of the type depicted in FIG. 7A, the totality of the resulting vacuum adherence forces being sufficient to enable the blade crawler to adhere to an airfoil-shaped body. The individual suction cups may be designed to adhere to a surface that is not flat and/or has inconsistencies using vacuum adherence forces with a desired level of strength while minimizing static friction between the blade crawler and the airfoil-shaped body. Further, the capability of each of a multiplicity of pivotable seal assemblies 58 to rotate about a corresponding pivot point and each of a multiplicity of sleeves 54 to float within a corresponding sleeve housing 52 may allow the blade crawler to move along a surface having varying shapes and/or surface inconsistencies. For example, the airfoil-shaped body may have a convex curved surface. In some cases, the surface may have inconsistencies such as, for example, without limitation, protrusions, protruding fastener joints, and/or other types of inconsistencies that may affect the width of the gaps between the suction cups and the confronting surface as the blade crawler moves over the surface.

Figure 7B:
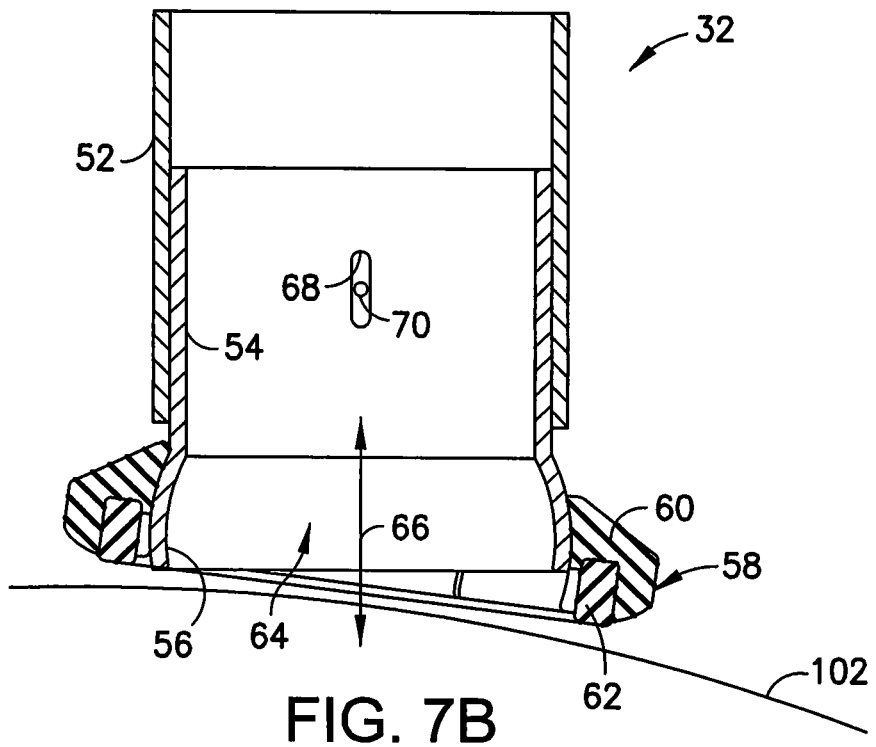
FIG. 7B is a diagram showing a cross-sectional view of the vacuum adherence device depicted in FIG. 7A adhered to a non-planar surface. The air gap between the vacuum adherence device and the non-planar surface has been exaggerated for the purpose of illustration. [What is FIG. 8c?]

FIG. 7B shows a cross-sectional view of the floating suction cup 32 depicted in FIG. 7A adhered to a convex curved surface 102. The air gap between the suction cup 32 and the convex curved surface 102 has been exaggerated for the purpose of illustration. The air gap may function as an air bearing that holds the pivotable seal assembly 58 close to surface 102, while reducing static friction to within selected tolerances. In other words, the air gap allows pivotable seal assembly 58 to "float" above surface 102 while maintaining vacuum adherence between pivotable seal assembly 58 and surface 102. Further, the air gap allows pivotable seal assembly 58 to be moved over surface 102 with a reduced amount of static friction and without causing undesired effects to surface 102. The height of the air gap may be within selected tolerances for maintaining the strength of the vacuum adherence force in a desired range. The air gap height can be varied as a function of the spring constant of the compression spring (not shown in FIG. 7B) and/or the vacuum pressure inside the channel 64 of the suction cup 32.

The gaps between the seals and the surface of the airfoil-shaped body allow the suction cups to float above the surface while the downward force provided by the vacuum system allows the drive wheel and alignment elements (e.g., ball-and-socket bearings) on the blade crawler to remain in contact with the surface. In this manner, the blade crawler may exert normal force on the drive wheel to create friction between the drive wheel and blade surface, thus obtaining traction for the drive wheel, which may be coupled to a motor that propels the blade crawler in a spanwise direction. Consequently, the blade crawler may adhere to the surface and move along the airfoil-shaped body with a reduced amount of friction between the blade crawler and the surface as the drive wheel propels the crawler spanwise along the blade.

The widths of the gaps between the seals and the surface may determine the strength of the vacuum adherence formed between the blade crawler and the surface. When the gap is wider than some specified threshold, the vacuum adherence may not have the desired level of strength. Consequently, the blade crawler may lose traction and be unable to travel in the spanwise direction. When the gap is narrower than some specified threshold, the vacuum adherence may be stronger than desired. Consequently, the blade crawler may become stuck to the surface and unable to move. Accordingly, the system may be adjusted prior to performing a maintenance operation to produce vacuum adherence forces within a desired range.

In one embodiment, the seal 62 may be corrugated in such a way as to allow small channels for airflow between the seal 62 and component surface 102. In some instances, these corrugated channels have been shown to promote vacuum on surfaces of uneven profile or varying surface roughness. In accordance with this embodiment, the corrugations may comprise a low-friction material that further induces sliding such that crawler motion will be enabled, yet airflow is ensured by the corrugated channels.

In another embodiment (not shown), a multiplicity of small ball-and-socket bearings may be arranged along a circular perimeter surrounding (i.e., radially outward of) the seal 62. Alternatively, these ball-and-socket bearings can be disposed along a circular perimeter radially inward of the seal or actually embedded in the seal. The ball-and-socket bearings should be installed in such a way that a precise gap is always maintained between the seal and the surface of the component 102. A similar arrangement involving the placement of ball-and-socket bearings in proximity to a seal of a vacuum plate will be described below with reference to FIG. 10.

Referring again to FIG. 7B, the pivotable seal assembly 58 is rotated relative to the convex curved surface 102 such that the pivotable seal assembly 58 at least partially conforms to that surface. Further, the sleeve 54 is moved in a direction along a center axis through the sleeve housing 52. Thereafter, air is drawn into the channel 64 such that the pivotable seal assembly 58 adheres to the surface 102. These operations may be performed during movement of the blade crawler along the airfoil-shaped body. Rotation of the pivotable seal assembly 58 and movement of the sleeve 54 allow the adherence system to adapt to changes in the shape of the surface 102 as the blade crawler moves along the surface.

As shown in FIG. 3, multiple floating suction cup assemblies are configured with one or more ball-and-socket bearings to comprise respective adherence manifold assemblies. The floating suction cups contain a specific mechanism that allows them to extend toward the blade surface, then, once engaged, the suction cups retract, drawing the adherence manifold assembly and the blade surface together, such that adherence contact can be maintained between the ball-and-socket bearings and the blade surface. Because the suction cups are configured with a floating nature, the entire adherence manifold can still float relative to the blade surface while maintaining adherence forces. For the purpose of the following discussion, the lower adherence attachment plate 30b and the suction cups 32b and ball-and-socket bearings 38 attached to the lower adherence attachment plate 30b will be referred to as the lower adherence manifold assembly.

Figure 8A:
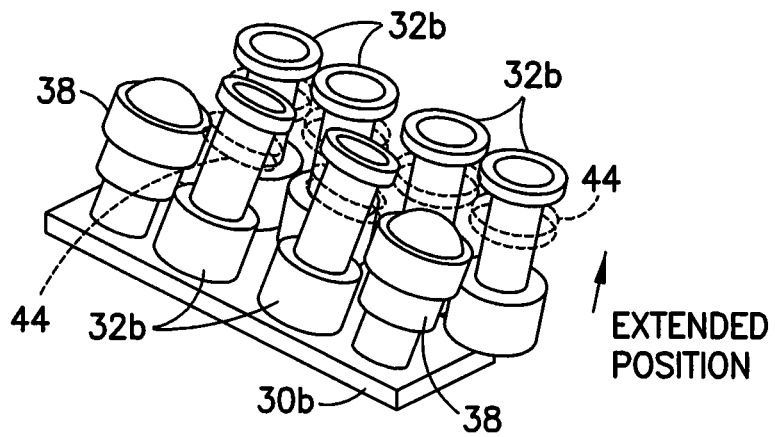
FIGS. 8A through 8C are diagrams showing isometric views of a floating suction cup assembly during a process of providing adhering contact between a blade component and a pair of ball-and-socket bearings for maintaining alignment of a crawler on the blade component.
Figure 8B:
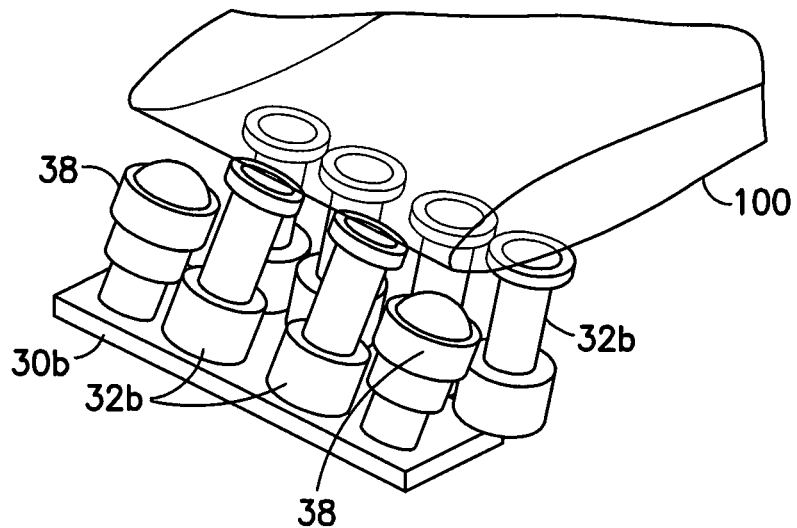
Figure 8C:
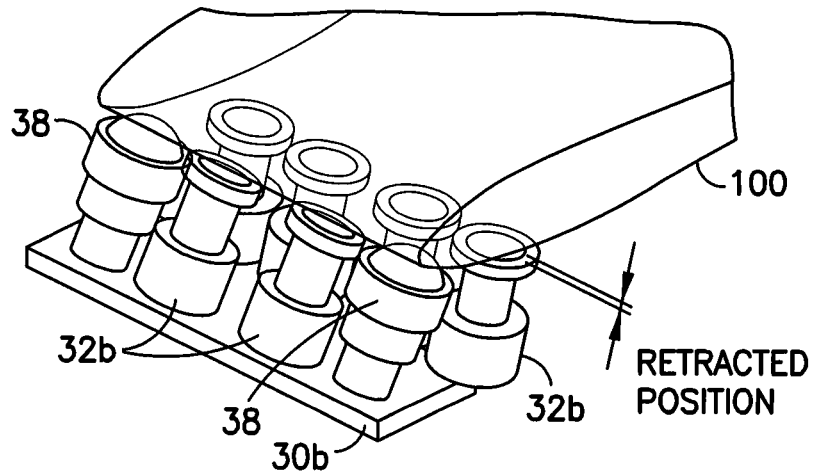

FIGS. 8A-8C show the lower adherence manifold assembly at three stages in the process of providing adhering contact between the ball-and-socket bearings 38 and the lower surface of the airfoil-shaped body 100 for maintaining alignment of a crawler on the airfoil-shaped body 100. It may be appreciated that the upper and aft adherence manifold assemblies shown in FIG. 3 are constructed to operate in a similar manner as will now be described.

FIG. 8A shows the lower adherence manifold assembly when the channels inside the suction cups 32b are at the ambient atmospheric pressure, not a vacuum pressure, i.e., the suction cups are not producing suction. Each of the six suction cups 32b of the lower adherence manifold assembly further comprises a compression spring (not shown), which can be arranged to urge the retractable sleeve (see sleeve 54 in FIG. 7A) of each suction cup to move relative to the sleeve housing (see sleeve housing 52 in FIG. 7A) in a direction of extension (indicated by an arrow in FIG. 8A). This compression spring also resists retraction of the sleeve into the housing, which resistance can be overcome by the production of a vacuum adherence force greater than the spring force. FIG. 8A shows the retractable sleeves of suction cups 32b in their respective extended position, with their respective retracted position being indicated by dashed ellipses 44.

In the state depicted in FIG. 8B, the lower adherence manifold assembly is placed under the lower surface of the airfoil-shaped body 100 while the suction is turned off. In this state, the compression springs 44 urge the seals at the ends of the sleeves of the suction cups 32b into contact with the lower surface of the airfoil-shaped body 100 while the balls of the ball-and-socket bearings 38 are not in contact.

When the channels of the suction cups 32b are partially evacuated, the sleeves of the suction cups 32b retract, thus bringing the balls of the ball-and-socket bearings 38 into contact with the airfoil, as depicted in FIG. 8C. While the sleeves are retracting, the suction forces produced by the partially evacuated suction cups of the lower adherence manifold assembly produce adherence forces on the lower surface of the airfoil-shaped body 100. The same operations apply to the upper and aft adherence manifold assemblies seen in FIG. 3, causing those assemblies to produce adherence forces on the upper surface of the airfoil-shaped body 100. The result is a total suction force sufficient to cause adherence of the crawler vehicle to the surface of the airfoil-shaped body 100 while still allowing the crawler vehicle to move over the surface of the airfoil-shaped body 100 by rolling on the balls of the ball-and-socket bearings 38. For example, the adherence forces will assist in holding the drive wheel 26 (see FIG. 1) against the leading edge 94 of the airfoil-shaped body 100, enabling the generation of a tractive force sufficient to overcome the small frictional forces exerted on the crawler vehicle by the vacuum adherence devices.

Figure 9A:
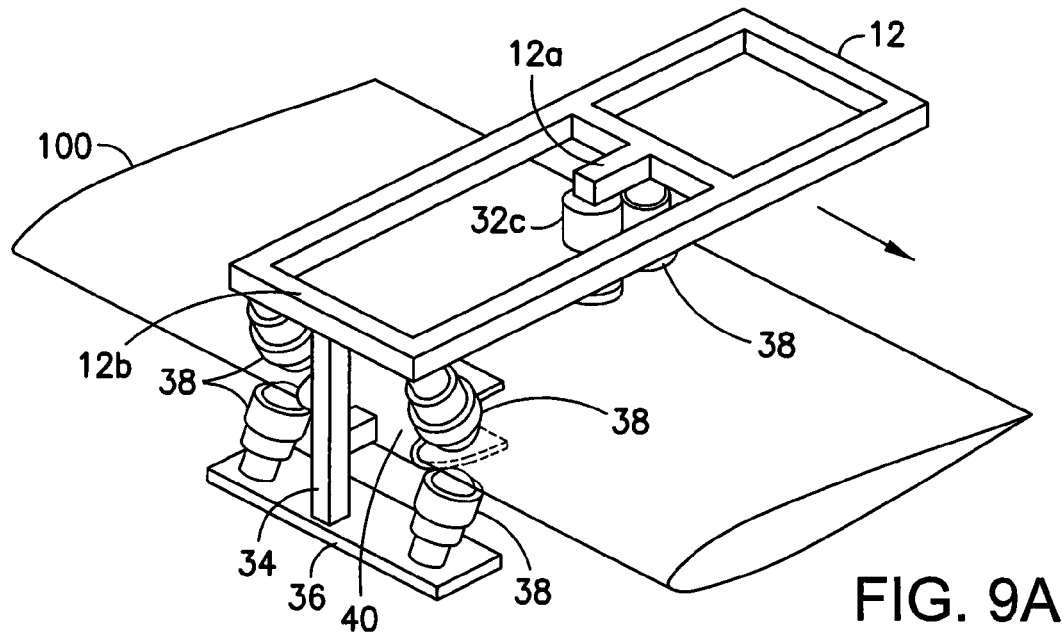
FIG. 9A is a diagram showing an isometric view of some components of a blade crawler having a flexible vacuum plate to maintain adherence and assisting in alignment and a set of ball-and-socket bearings for assisting in alignment on a blade component in accordance with a further alternative embodiment. The end effector for performing a maintenance function and the means for scanning that end effector in a chordwise direction are not shown to avoid clutter in the drawing.

FIG. 9A shows an isometric view of some components of a blade crawler having a vacuum adherence device for maintaining alignment on a blade component in accordance with a further alternative embodiment. The embodiment shown in FIG. 9A differs from the embodiment shown in FIG. 4 in that a flexible vacuum plate 40 is attached to a cantilever beam that connects to the vertical beam 34. The flexible vacuum plate 40 performs the adherence function in place of the plurality of floating suction cups 32a that are part of the upper adherence manifold assembly seen in FIG. 4. The flexible vacuum plate 40 is designed with the capability to conform to the shape of a surface of the airfoil-shaped body 100. In the implementation shown in FIG. 9A, the flexible vacuum plate 40 is wrapped around a portion of the leading edge 94. In this implementation, the upper portion of flexible vacuum plate 40 is situated between the balls of the pair of ball-and-socket bearings 38 attached to attachment plate 36, while the lower portion of flexible vacuum plate 40 is situated between the balls of the pair of ball-and-socket bearings 38 attached to the forward cross beam 12b.

Figure 9B:
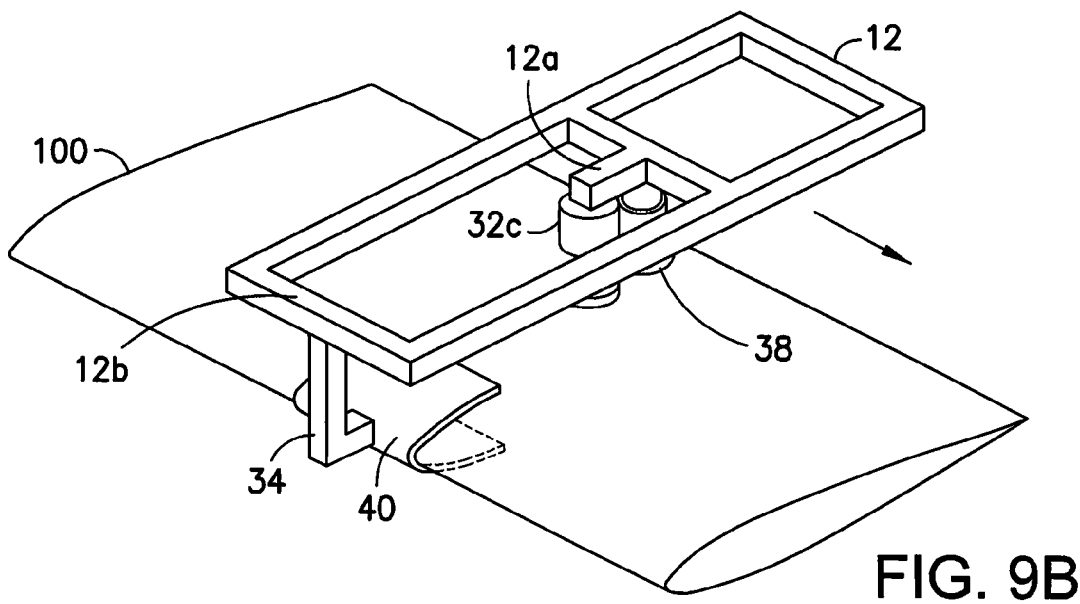
FIG. 9B is a diagram showing an isometric view of some components of a blade crawler having a flexible vacuum plate for maintaining both adherence and alignment on a blade component in accordance with an alternative embodiment. The end effector for performing a maintenance function and the means for scanning that end effector in a chordwise direction are not shown to avoid clutter in the drawing.

In accordance with yet another alternative embodiment shown in FIG. 9B, the ball-and-socket bearings 38 disposed near the leading edge 94 of the airfoil-shaped body 100 can be eliminated. The blade crawler is adhered to the airfoil-shaped body 100 by the flexible vacuum plate 40 and the aft suction cup 32c, which both float on the surfaces of the airfoil-shaped body 100 when they are partially evacuated. The aft ball-and-socket bearing 38 seen in FIG. 9B is capable of omnidirectional movement over the upper surface of the airfoil-shaped body 100 while maintaining the alignment of the crawler vehicle on the airfoil-shaped body 100.

Figure 10:
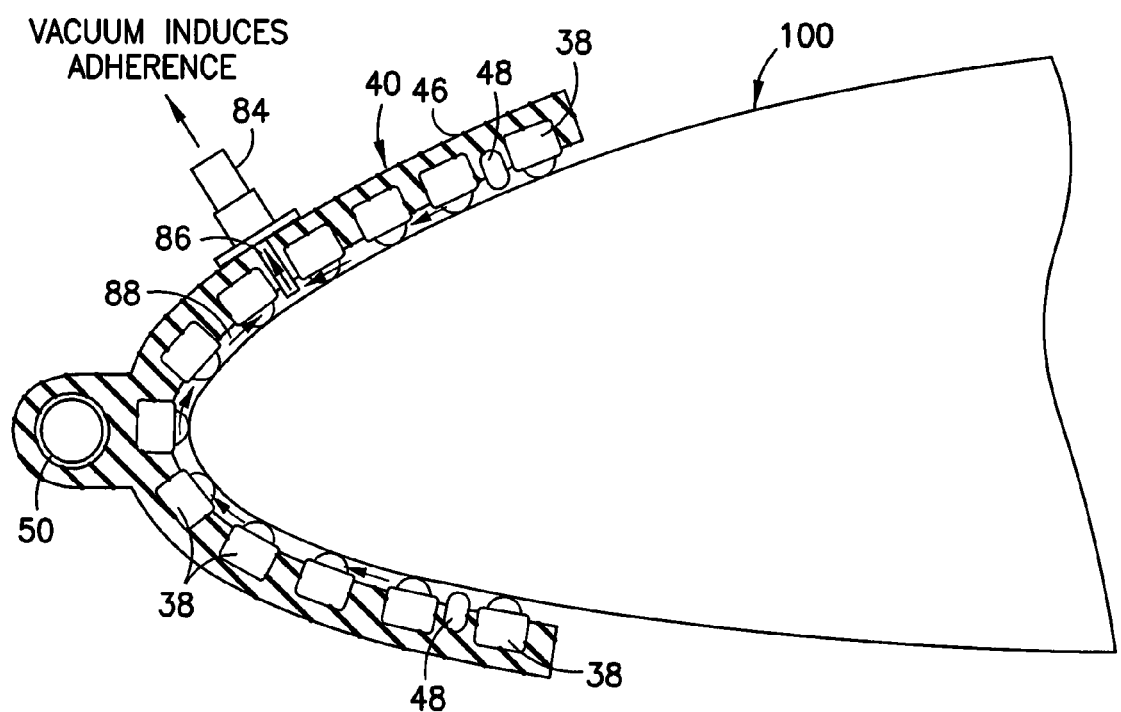
FIG. 10 is a diagram showing a sectional view of a flexible vacuum plate designed to conform to the leading edge of a blade component in accordance with one embodiment.

The structure of a flexible vacuum plate in accordance with one implementation is shown in FIG. 10, which is a sectional view taken in a plane normal to the axis of the airfoil-shaped body 100. The flexible vacuum plate 40 is an assembly comprising a flexible substrate 46 (made, e.g., of semi-rigid rubber optionally reinforced with carbon or nylon rods), a flexible vacuum seal 48 (made, e.g., of rubber) attached to the flexible substrate 46 along a perimeter, and a multiplicity of the ball-and-socket bearings 38, the sockets of which are embedded in the flexible substrate 46. When in a flattened state, the shape of the flexible substrate 46 is rectangular, while the ball-and-socket bearings 38 are arranged in rows and columns. Only one column of ball-and-socket bearings 38 is shown in FIG. 10.

The flexible substrate 46 and opposing surfaces of the airfoil-shaped body 100 form a chamber 88 which is sealed along a perimeter by the vacuum seal 48. This vacuum seal 48 is designed so that when the balls of the ball-and-socket bearings 38 are in contact with the surfaces of the airfoil-shaped body 100, there will be a slight gap between the vacuum seal 48 and the confronting surface of the airfoil-shaped body 100 that allows some air to flow into chamber 88 when the latter is partially evacuated.

The flexible substrate 46 can be formed by molding. The molded structure shown in FIG. 10 includes a protuberance that has an attachment bushing 50 embedded therein for coupling the flexible vacuum plate 40 to the support structure of the crawler vehicle. The flexible substrate 46 further includes an opening that has a channel 86 embedded therein. The channel 86 connects to a vacuum port 84, which is in turn connected to a vacuum pump by means not shown in FIG. 10. The distal end of the channel 86 is in flow communication with the chamber 88. When the vacuum pump is activated, the resulting partial vacuum formed in chamber 88 will produce a suction force that adheres the flexible vacuum plate 40 to airfoil-shaped body 100, but still allows the flexible vacuum plate 40 to float on airfoil-shaped body 100 due to the air cushion created by air being sucked through the slight gap between vacuum seal 48 and the airfoil-shaped body 100. The flow of air inside chamber 88, through channel 86 and out vacuum port 84 during evacuation is indicated by arrows in FIG. 10.

FIGS. 10A and 10B show sectional views of a hinged vacuum plate designed to conform to the leading edge of an airfoil-shaped body 100 in accordance with an alternative embodiment. In FIG. 10A, the hinged vacuum plate is shown adhered to a small-radius leading edge; in FIG. 10B, the hinged vacuum plate is shown adhered to a large-radius leading edge. In contrast to the flexible vacuum plate depicted in FIG. 10, the hinged vacuum plate comprises a plurality of rigid segments 46a connected by continuous membranes 46b. The rigid segments 46a, continuous membranes 46b, confronting surface of the leading edge of the airfoil-shaped body 100, and vacuum seal 48 form a chamber which, when partially evacuated, causes the hinged vacuum plate to adhere to the leading edge of the airfoil-shaped body 100. The continuous membranes 46b maintain the integrity of that chamber. The hinged vacuum plate further comprises a plurality of hinges 90 (four in the implementation shown in FIGS. 10A and 10B) which flex to accommodate large variations in leading edge radius. The hinges 90 may incorporate biasing means, such as springs, arranged to urge the rigid segments 46a toward the confronting surface of the leading edge when the chamber is not evacuated.

Figure 11:
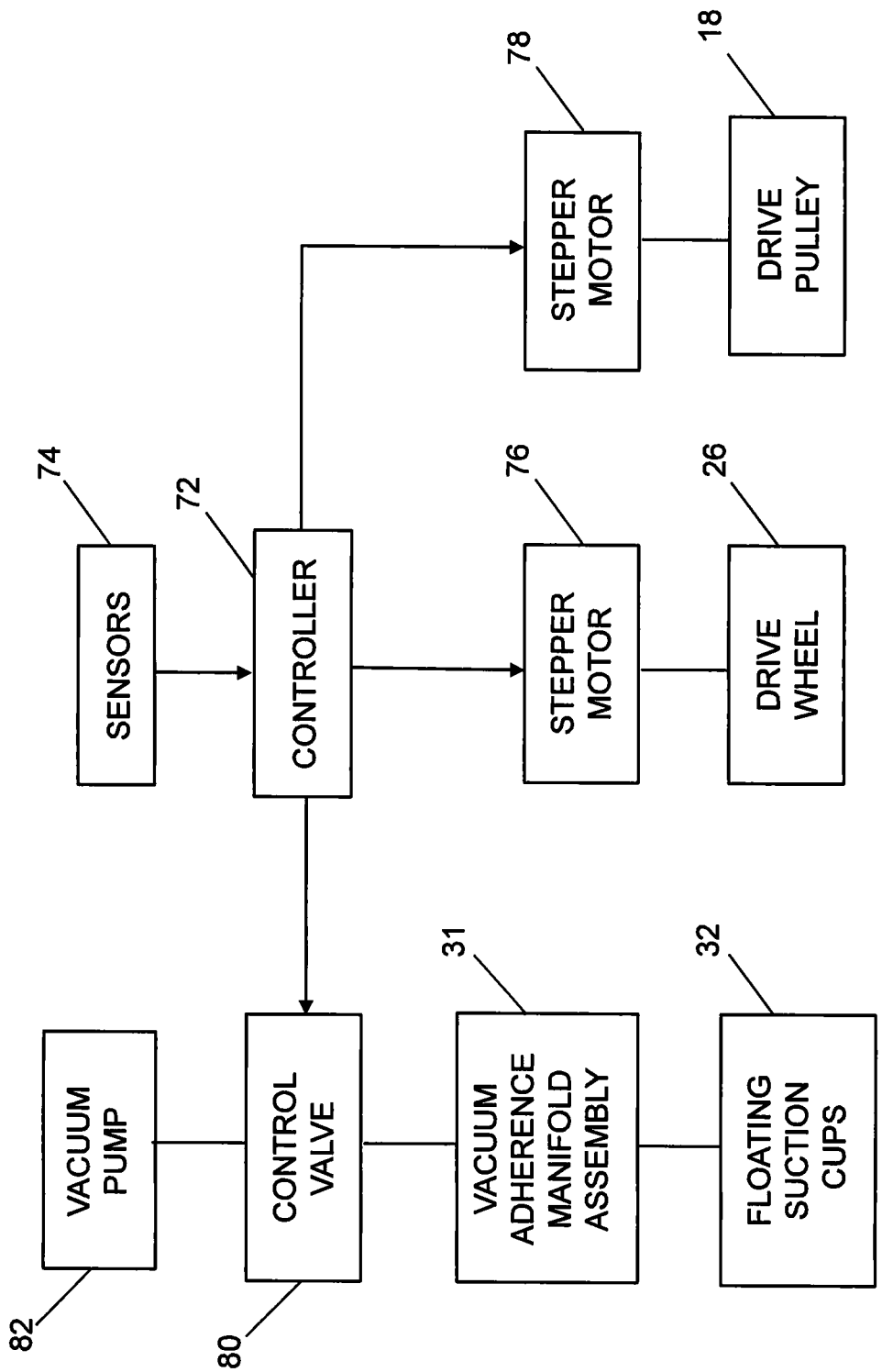
FIG. 11 is a block diagram identifying some components of a system comprising a computer-controlled blade crawler having vacuum adherence devices for maintaining adherence and alignment on a blade component.

FIG. 11 is a block diagram identifying some components of a system comprising a computer-controlled blade crawler having vacuum adherence devices for maintaining alignment on a blade component in accordance with one embodiment. Various components of the end effector-carrying blade crawler communicate with a control computer 72 located at an operations command center. The control computer may be connected to the blade crawler by an electrical cable (not shown in the drawings). Alternatively, the control computer and the blade crawler could communicate wirelessly.

The control computer 72 controls the operations of a pair of stepper motors 76 and 78, which are mounted on the above-described support structure of the crawler vehicle. Stepper motor 76 drives rotation of the drive wheel 26 during spanwise movement of the crawler vehicle. Stepper motor 78 drives rotation of the drive pulley 18 during chordwise movement of the end effector. The control computer 72 controls stepper motors 76 and 78 in dependence on crawler position information derived from sensors 74. When the blade crawler reaches a target spanwise position, the control computer can be programmed to shut off stepper motor 76 and then start stepper motor 78. The sensors 74 may include position encoders that generate pulses in response to incremental movements of the crawler vehicle in the spanwise direction and position encoders that generate pulses in response to incremental movements of the end effector in the chordwise direction.

In cases where the end effector is a rotary tool (such as a scarfer, drill, deburrer or reamer), when the rotary tool reaches a target chordwise position, the control computer 72 can be programmed to shut off the stepper motor 78 and then start an end effector motor (not shown), e.g., a drive motor which drives rotation of the rotary tool. It should be appreciated that in cases where the end effector is emitting or ingesting a liquid or particles, the control computer 72 will activate a pump. In cases where the end effector's elevational position is adjustable by operation of an actuator, such actuator may also be controlled by the computer.

In addition, the control computer 72 can be programmed to control the state of an electrically controllable valve 80 that connects a vacuum pump 82 to a plurality of vacuum adherence manifolds 31. Each vacuum adherence manifold 31 is in flow communication with one or more suction cups 32, as described above with reference to FIGS. 2 and 3. The control computer 72 can be programmed to send a signal that causes the valve 80 to remain open during operation of the crawler vehicle. In the valve open state, the vacuum pump 82 will apply a partial vacuum to the vacuum adherence manifolds 31 and channels of the suction cups 32, thereby adhering the crawler vehicle to the airfoil-shaped body.

The control computer may also be programmed to control a cable management system (not shown). For example, motion control application software running on the control computer can control a cable motor of the cable management system. When the blade crawler is operated, one or more cables need to accompany the crawler down the length of the airfoil-shaped body, e.g., a helicopter blade. The motion control software running on the control computer synchronizes the movement of the cables with the movement of the blade crawler, extending or retracting the cables as appropriate. The control computer 72 can be programmed to control the cable motor (not shown) in dependence on crawler position information derived from sensors 74.

In accordance with the embodiments described above, the control computer is provided with information concerning the spanwise position of the crawler. This functionality can be provided by any one of a multiplicity of known positional tracking mechanisms.

The blade crawler disclosed herein can be adapted for use in the automation of various maintenance functions, including but not limited to nondestructive inspection, drilling, grinding, fastening, appliqué application, scarfing, ply mapping, depainting, cleaning and painting. There are a number of types of blade components on aircraft that will benefit from maintenance automation, including rotorcraft blades, propeller blades, flaps, ailerons, trim tabs, slats, stabilators and stabilizers.

The use of vacuum adherence devices to adhere a crawler vehicle to an airfoil-shaped body, such as a blade component, provides multiple benefits, including: (1) the ability to maintain reliable contact between the crawler vehicle and blade component; (2) the ability to accommodate trailing edge protrusions (e.g., trim tabs) without the need for an aft follower wheel; (3) the ability to accommodate swept blade configurations; (4) the ability to accommodate blade surface roughness and non-uniformities; (5) lower cost/skill to operate when adherence is automatic; and (6) the provision of a low-cost apparatus with elimination of an aft follower wheel and an aft lower ball-and-socket bearing. With the ability to track along complex-geometry rotor blades, propellers and other airfoils, autonomously translate over trailing edge protrusions without loss of functionality, and accommodate swept blade configurations, the crawler vehicles disclosed above can provide manufacturing and in-service automated NDI and repair functionality.

While automated blade crawlers have been described with reference to particular embodiments, it will be understood by those skilled in the art that various changes may be made and equivalents may be substituted for elements thereof without departing from the scope of the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. An apparatus comprising:
a frame;
a vacuum adherence device coupled to said frame, said vacuum adherence device comprising a seal, the orientation of said seal relative to said frame being adaptable;
a carriage linearly displaceably coupled to said frame;
a first motor for driving linear displacement of said carriage along said frame;
an end effector coupled to said carriage, said end effector being configured to perform a maintenance function, wherein said maintenance function consists of at least one of the following: nondestructive inspection, drilling, scarfing, grinding, fastening, appliqué application, ply mapping, depainting, cleaning, and painting;
a drive wheel rotatably coupled to said frame; and
a second motor for driving rotation of said drive wheel.

2. The apparatus as recited in claim 1, further comprising a ball-and-socket bearing coupled to said frame or to said vacuum adherence device, wherein a ball of said ball-and-socket bearing is disposed within or in proximity to an area bounded by said seal and protrudes beyond said seal.

3. The apparatus as recited in claim 2, wherein said vacuum adherence device comprises a vacuum plate having a channel, said seal is attached to and projects from a side of said vacuum plate, and said ball-and-socket bearing is coupled to said vacuum plate in an area bounded by said seal, said apparatus further comprising a vacuum port in flow communication with a space adjacent said area bounded by said seal via said channel.

4. The apparatus as recited in claim 3, wherein said vacuum plate comprises flexible material capable of conforming to a shape of a confronting surface of an airfoil-shaped body.

5. The apparatus as recited in claim 3, wherein said vacuum plate comprises a plurality of rigid segments, a plurality of continuous membranes connecting said plurality of rigid segments in series, and a plurality of hinges which pivotably couple adjacent rigid segments of said plurality of rigid segments.

6. The apparatus as recited in claim 2, further comprising an attachment plate having a first channel, wherein said vacuum adherence device comprises a suction cup having a second channel in flow communication with said first channel, said suction cup and said ball-and-socket bearing being attached to said attachment plate, and said second channel having an opening surrounded by said seal.

7. The apparatus as recited in claim 6, wherein said suction cup comprises:
a sleeve housing attached to said attachment plate;
a sleeve comprising a first portion displaceably coupled to said sleeve housing and a second portion comprising a bearing surface; and
a socket ring pivotably coupled to said second portion of said sleeve and comprising a bearing surface in contact with said bearing surface of said second portion of said sleeve, said seal being attached to said socket ring.

8. An apparatus comprising:
a frame;
an attachment plate coupled to said frame; and
a plurality of suction cups, each of said suction cups comprising a sleeve housing attached to said attachment plate, a sleeve comprising a first portion displaceably coupled to said sleeve housing and a second portion comprising a bearing surface, a socket ring pivotably coupled to said second portion of said sleeve and comprising a bearing surface in contact with said bearing surface of said second portion of said sleeve, and a seal attached to said socket ring.

9. The apparatus as recited in claim 8, further comprising:
a carriage linearly displaceably coupled to said frame;
a first motor for driving linear displacement of said carriage along said frame;
an end effector coupled to said carriage, said end effector being configured to perform a maintenance function, wherein said maintenance function consists of at least one of the following: nondestructive inspection, drilling, scarfing, grinding, fastening, appliqué application, ply mapping, depainting, cleaning, and painting;
a drive wheel rotatably coupled to said frame; and
a second motor for driving rotation of said drive wheel.

10. The apparatus as recited in claim 8, further comprising first and second ball-and-socket bearings, each of said first and second ball-and-socket bearings comprising a socket attached to said attachment plate and a ball rotatably coupled to said socket.

11. An apparatus comprising:
a frame;
a vacuum plate coupled to said frame, said vacuum plate comprising a channel;
a seal attached to and projecting from a side of said vacuum plate;
a vacuum port in flow communication with a space adjacent an area bounded by said seal via said channel of said vacuum plate;
a carriage linearly displaceably coupled to said frame;
a first motor for driving linear displacement of said carriage along said frame;
an end effector coupled to said carriage, said end effector being configured to perform a maintenance function, wherein said maintenance function consists of at least one of the following: nondestructive inspection, drilling, scarfing, grinding, fastening, appliqué application, ply mapping, depainting, cleaning, and painting;
a drive wheel rotatably coupled to said frame; and
a second motor for driving rotation of said drive wheel.

12. The apparatus as recited in claim 11, wherein said vacuum plate comprises flexible material capable of conforming to a shape of a confronting surface of an airfoil-shaped body.

13. The apparatus as recited in claim 11, wherein said vacuum plate comprises a plurality of rigid segments, a plurality of continuous membranes connecting said plurality of rigid segments in series, and a plurality of hinges which pivotably couple adjacent rigid elements of said plurality of rigid elements.

14. The apparatus as recited in claim 11, further comprising a plurality of ball-and-socket bearings coupled to said vacuum plate, wherein said vacuum plate can be positioned adjacent a portion of an airfoil-shaped body in a manner such that said seal is adjacent to and balls of said plurality of ball-and-socket bearings are in contact with that portion of the airfoil-shaped body.

15. A method for coupling a crawler vehicle to an airfoil-shaped body, comprising:
equipping the crawler vehicle with vacuum adherence devices;
placing the vacuum adherence devices in positions such that respective seals of those vacuum adherence devices are adjacent to respective portions of the surface of the airfoil-shaped body;
partially evacuating respective channels of the vacuum adherence devices to produce floating adherence of the crawler vehicle to the surface of the airfoil-shaped body;
equipping the crawler vehicle with ball-and-socket bearings, a drive wheel and a motor for driving rotation of the drive wheel;
placing the ball-and-socket bearings and the drive wheel in contact with respective portions of the surface of the airfoil-shaped body, the drive wheel being oriented to roll in a spanwise direction along the surface of the airfoil-shaped body; and
driving the drive wheel to rotate.

16. A system comprising:
an airfoil-shaped body having a surface;
a frame;
a first vacuum adherence device comprising a channel and a seal capable of adapting to a contour of said surface, wherein said first vacuum adherence device is coupled for concurrent movement with said frame;
a vacuum system coupled to enable partial evacuation of said channel of said first vacuum adherence device, wherein said vacuum system comprises an electrically controllable valve;
a drive wheel in contact with said airfoil-shaped body, wherein said drive wheel is rotatably coupled to said frame;
a carriage linearly displaceably coupled to said frame;
an end effector coupled to said carriage, said end effector being configured to perform a maintenance function, wherein said maintenance function consists of at least one of the following: nondestructive inspection, drilling, scarfing, grinding, fastening, appliqué application, ply mapping, depainting, cleaning, and painting;
a first motor for driving linear displacement of said carriage;
a second motor for driving rotation of said drive wheel; and
a computer system programmed to control said electrically controllable valve and said first and second motors during a maintenance operation in which said end effector travels over the surface of said airfoil-shaped body.

17. The system as recited in claim 16, wherein said first vacuum adherence device comprises a flexible vacuum plate having said channel formed therein and said seal attached thereto, said flexible vacuum plate being capable of conforming to a contour of said surface of said airfoil-shaped body.

18. The system as recited in claim 16, wherein said first vacuum adherence device comprises a plurality of rigid segments, a plurality of continuous membranes connecting said plurality of rigid segments in series, and a plurality of hinges which pivotably couple adjacent rigid segments of said plurality of rigid segments.

19. The system as recited in claim 16, further comprising a second vacuum adherence device comprising a channel and a seal capable of adapting to a contour of said surface, said second vacuum adherence device being carried by said frame, and said vacuum system comprising a manifold in flow communication with said channels of said first and second vacuum adherence devices.

20. The system as recited in claim 19, further comprising first and second vacuum generators in fluid communication with said channels of said first and second vacuum adherence devices respectively.

21. The system as recited in claim 16, further comprising a ball-and-socket bearing comprising a ball in contact with said surface of said airfoil-shaped body.

22. A system comprising:
an airfoil-shaped body having a surface;
a frame;
a first vacuum adherence device comprising a vacuum plate, a channel and a seal capable of adapting to a contour of said surface, wherein said first vacuum adherence device is coupled for concurrent movement with said frame;
a vacuum system coupled to enable partial evacuation of said channel of said first vacuum adherence device;
a drive wheel in contact with said airfoil-shaped body, wherein said drive wheel is rotatably coupled to said frame;
a plurality of ball-and-socket bearings coupled to said vacuum plate, said plurality of ball-and-socket bearings projecting from said vacuum plate and being in contact with said surface of said airfoil-shaped body,
wherein said seal and surfaces of said vacuum plate and said airfoil-shaped body form a chamber in flow communication with said channel.

23. A system comprising:
an airfoil-shaped body having a surface;
a frame;
a first vacuum adherence device comprising a seal capable of adapting to a contour of said surface, a sleeve housing, a sleeve comprising a first portion displaceably coupled to said sleeve housing and a second portion comprising a bearing surface, said seal, said sleeve and said sleeve housing forming a channel, and a socket ring pivotably coupled to said second portion of said sleeve and comprising a bearing surface in contact with said bearing surface of said second portion of said sleeve, said seal being attached to said socket ring, wherein said first vacuum adherence device is coupled for concurrent movement with said frame;
a vacuum system coupled to enable partial evacuation of said channel of said first vacuum adherence device; and
a drive wheel in contact with said airfoil-shaped body, wherein said drive wheel is rotatably coupled to said frame.

* * * * *